Sept. 2, 1952  G. W. WOOD  2,609,127
FERTILIZER DISTRIBUTOR
Filed Aug. 12, 1947
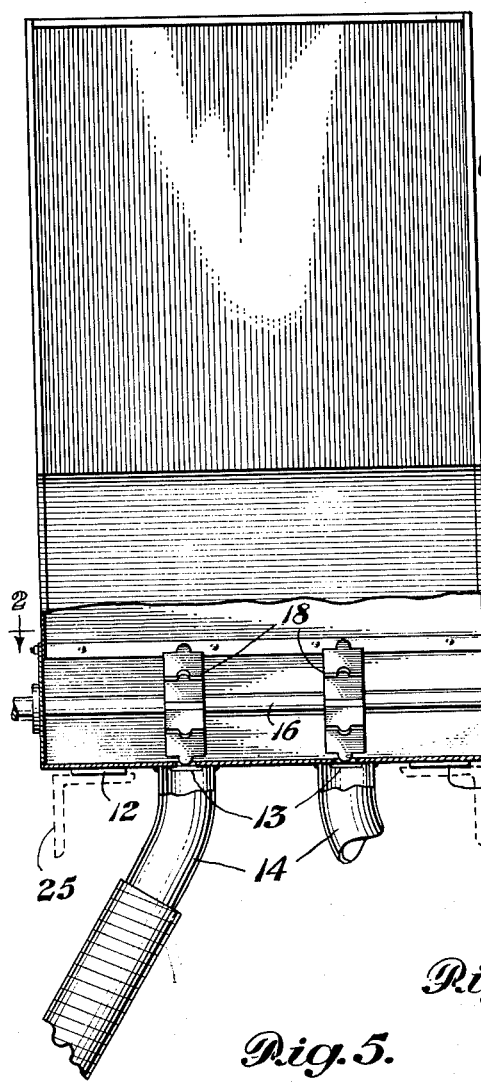
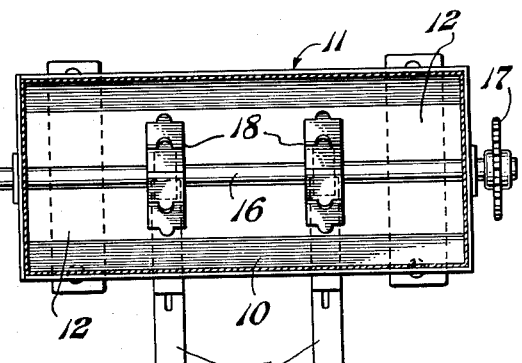
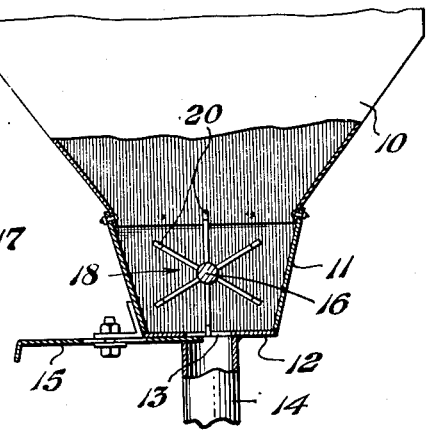
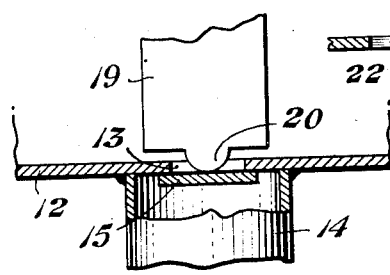
Inventor
George W. Wood,
By _____ Attorney Patented Sept. 2, 1952

2,609,127

UNITED STATES PATENT OFFICE 2,609,127

FERTILIZER DISTRIBUTOR

George W. Wood, Stephenville, Tex.

Application August 12, 1947, Serial No. 768,108

5 Claims. (Cl. 222—274)

The invention relates to dispensing devices and more particularly to a device of this character which may be employed for the distribution of fertilizer.

An important object of the invention is to provide a fertilizer distributor which may be used to distribute all kinds of commercial fertilizer without the usual clogging, stoppage and irregular flowing or feeding such as is commonly encountered with distributors now in use.

I have designed a distributor which has proved successful with all kinds of fertilizer and varied conditions of the weather, and which effectively insures the flow of fertilizer even where moisture is absorbed by the fertilizer in a manner which would stall or clog fertilizer distributors of the usual type.

An important feature of my distributor resides in the use of rotary type agitator members including a plurality of rotary arms or blades each having a point or projection which passes through a slot in the bottom of the distributor, thus eliminating any possibility of clogging and insuring a steady flow of fertilizer at all times. The distributor is preferably equipped with an adjustable slide regulator sliding below the distributor box and permitting the desired amount of fertilizer to be discharged at all times, which slide valve does not interfere with the operation of the rotary arms of the distributor.

The fertilizer distributor is of simple construction and may be made at reasonable cost with a minimum number of movable parts, thus avoiding the usual losses incident to wear. The hopper of the distributor may be made of galvanized iron with seams rolled together for sturdy construction, and the bottom unit with which the hopper is equipped may be made of flat steel electrically welded into one unit and attached to the upper hopper by means of stove bolts or the like.

The distributor may be secured to a planter, tractor or the like by any suitable means, as by brackets formed of strap steel. The fertilizer distributors may be made in single row units, double row units, or multiple units to suit the number needed for different tractors or planters, and if desired several units may be attached to broadcast grain drills, enabling the user to fertilize and plant in one operation.

The invention will be more readily understood by reference to the accompanying drawings and the following detailed description, in which a specific embodiment of a two-row unit is set forth by way of illustration, but it will be obvious that the device may be adapted to any desired number of rows.

In the drawings:

Fig. 1 is a side elevation of a distributor with parts broken away to show the interior;

Fig. 2 is a horizontal section on the line 2—2 of Fig. 1;

Fig. 3 is an end view with parts shown in transverse section and illustrating the operation of the distributor and the slide valve;

Fig. 4 is a detail sectional view on a larger scale showing the rotary distributor member and slide valve together with associated parts;

Fig. 5 is a detail sectional view taken at right angles to Fig. 4 and showing a portion of one of the distributor blades with its projecting point in its relation in the slot in the bottom of the distributor and to the slide valve.

Referring to the drawings in detail, the reference numeral 10 denotes a hopper which may comprise a commercial fertilizer distributor of any suitable capacity and which may be formed of galvanized sheet metal of any desired thickness. The lower portion of the hopper 10 slopes inwardly and to the bottom of such lower portion there is preferably attached a smaller hopper equipped with my improved rotary distributing mechanism. This small hopper 11 is provided with inclined sides and a flat bottom 12, and may be secured to the upper hopper by any suitable means, as by stove bolts or the like.

The bottom of the small hopper is provided with one or more slots 13 extending transversely of the floor or bottom 12 of the hopper 11. The slots are herein shown as two in number but it will be obvious that any desired number corresponding with the number of rows to be fertilized may be employed. The openings 13 are narrow in relation to their length and permit the flow of fertilizer from the distributor to suitable outlet pipes 14, 14 corresponding in number to the number of the slots.

Each slot 13 may be equipped with an adjustable slide valve 15 located just below the bottom 12 and serving to regulate the size of the openings 13 or to close said openings entirely.

Rotatably mounted lengthwise of the small hopper 11 is a shaft 16 which may be actuated by any suitable means, as, for example, the sprocket 17 which may be driven from any source of power on the tractor or planter. If desired a sprocket may be provided on each end of the shaft 16.

The shaft 16 is provided with rotary propelling or distributing units 18 corresponding in number to the number of slots 13 and distributor pipes 14. As shown, these units comprise a plurality of relatively wide flat blades 19 which rotate with the shaft 16 and serve to keep the fertilizer thoroughly agitated. Each of the blades 19 is equipped with a rounded point 20 which, as the shaft rotates, extends through its respective slot 13, thus assisting in the discharge of the fertilizer and eliminating any possibility of clogging the opening. These points insure a regular flow of even damp or lumpy fertilizer at all times. It will be noted, particularly in Fig. 5, that the points 20 extend only far enough into the slots 13 to prevent their clogging, but do not extend below the bottom surface of the floor 12 and accordingly do not in any way interfere with the movement of the slide valve 15.

The position of each slide valve may be secured by any suitable means, as for example, adjustment bolt 22 which coacts with a slot 23 in the slide valve and thus guides the valve in the desired direction. An adjustment nut 24 is provided to secure the slide valve in its adjusted position.

It will be apparent that the small hopper 11, equipped with the shaft 16, sprocket 17, blade 19 and slide valve 15, may be supplied as a unit and attached to any commercial fertilizer distributor. The assembly may be secured to a tractor, planter or the like by any suitable means, as for example, brackets 25, which may be formed of strap steel or the like welded to the bottom of the small hopper 11.

The invention has been described in detail for the purpose of illustration, but it will be obvious that numerous modifications and variations may be resorted to without departing from the spirit of the invention.

I claim:

1. A material distributor comprising a hopper, a rotary agitator member mounted on an axis extending lengthwise through the hopper, said hopper having a bottom provided with an outlet slot located beneath the agitator and extending transversely of the axis thereof, said agitator including a plurality of flat rectangular blades each extending radially from the axis and terminating short of the slot when in the downwardly extending position, the flat surfaces of each blade lying in parallel planes extending longitudinally of the axis of the agitator, and each blade having an extension of reduced width as compared with the width of the coresponding blade adapted to project into the slot as the agitator is rotated, to prevent clogging of the slot, the width of the blades being greater than the width of the transverse slot, and the width of the extension being less than the width of the slot.

2. A material distributor as set forth in claim 1, wherein a slide valve coacts with the slot to regulate the flow of material therethrough.

3. A material distributor as set forth in claim 1, wherein a plurality of parallel transverse slots are provided in the bottom of the hopper, and a plurality of rotary agitator members are provided on a common longitudinal axis, each agitator member coacting with one of the slots.

4. A device for distributing fertilizer or the like comprising a hopper having a pair of side walls, a pair of end walls and a flat bottom wall, a slot extending through the bottom wall in a direction transversely to the side walls, an adjustable transverse slide valve beneath the bottom wall coacting with said slot for opening or closing the same or varying its extent, and a rotary agitator mounted for rotation on an axis extending lengthwise of the hopper between the end walls and above the slot, said agitator comprising a plurality of flat rectangular blades extending radially from the axis, the flat surfaces of each of said blades lying in parallel planes extending longitudinally of the axis, each blade terminating short of the slot and having an end projection of reduced width as compared with the width of the blade adapted to extend into the slot when the blades are rotated to prevent clogging the slot, but not extending beyond the lower level of the slot, thereby permitting slidable adjustment of the valve, the width of the blades being greater than the width of the transverse slot, and the width of the projection being less than the width of the slot.

5. A device for distributing fertilizer or the like comprising a hopper having a pair of downwardly converging side walls, a pair of end walls and a flat bottom wall, a slot extending through the bottom wall in a direction transversely to the side walls, an adjustable transverse slide valve beneath the bottom wall coacting with said slot for opening or closing the same or varying its extent, and a rotary agitator mounted for rotation on an axis extending lengthwise of the hopper between the end walls and above the slot, said agitator comprising a plurality of flat rectangular blades extending radially from the axis, the flat surfaces of each of said blades lying in parallel planes extending longitudinally of the axis, and each blade having an end projection of reduced width as compared with the width of the blade adapted to extend into the slot when the blades are rotated to prevent clogging the slot, but not extending beyond the lower level of the slot, thereby permitting slidable adjustment of the valve, the width of the blades being greater than the width of the transverse slot, and the width of the projection being less than the width of the slot.

GEORGE W. WOOD.

REFERENCES CITED

The following references are of record in the file of this patent:

UNITED STATES PATENTS

| Number | Name | Date |
| --- | --- | --- |
| 20,357 | McCammon | May 25, 1858 |
| 27,350 | Carrington | Mar. 6, 1860 |
| 27,390 | Selby | Mar. 6, 1860 |
| 93,434 | Ham | Aug. 10, 1869 |
| 164,509 | Bailey | June 15, 1875 |
| 228,913 | Mann | June 15, 1880 |
| 352,158 | Snyder, Jr. | Nov. 9, 1886 |